United States Patent

Bukowski

[11] Patent Number: 6,026,607
[45] Date of Patent: Feb. 22, 2000

[54] APPARATUS FOR THREADING A HOOK

[76] Inventor: Ronald J. Bukowski, 475 Emroy Ave., Elmhurst, Ill. 60126

[21] Appl. No.: 08/954,580

[22] Filed: Oct. 20, 1997

[51] Int. Cl.[7] ............................ A01K 97/06; A01K 97/00
[52] U.S. Cl. ............................ 43/4; 43/1; 43/53.5; 7/106; 7/158; D22/149; 289/17
[58] Field of Search ...................... 43/1, 4, 53.5; 289/17; 7/106, 158, 118, 161; D22/149; 112/224

[56] References Cited

U.S. PATENT DOCUMENTS

| D. 247,713 | 4/1978 | Etes | D22/149 |
|---|---|---|---|
| 338,612 | 3/1886 | Pusey | 7/158 |
| D. 375,997 | 11/1996 | Tipp | D22/149 |
| 3,603,021 | 9/1971 | Nunley | 43/53.5 |
| 4,660,314 | 4/1987 | Janssen | 43/4 |
| 4,796,372 | 1/1989 | Klein | 43/4 |
| 4,864,762 | 9/1989 | Cox | 43/4 |
| 5,274,948 | 1/1994 | Harrison | 43/53.5 |
| 5,283,920 | 2/1994 | Plummer | 7/106 |
| 5,511,261 | 4/1996 | Collins | 7/158 |

*Primary Examiner*—Kurt Rowan

[57] ABSTRACT

An apparatus for threading a hook is provided including a housing and a hook threader wire coupled to the housing for threading a fishing line through an eyelet of a hook such that a pair of free ends of the fishing line reside on a first side of the eyelet and the fishing line forms a closed loop on a second side of the eyelet.

10 Claims, 3 Drawing Sheets

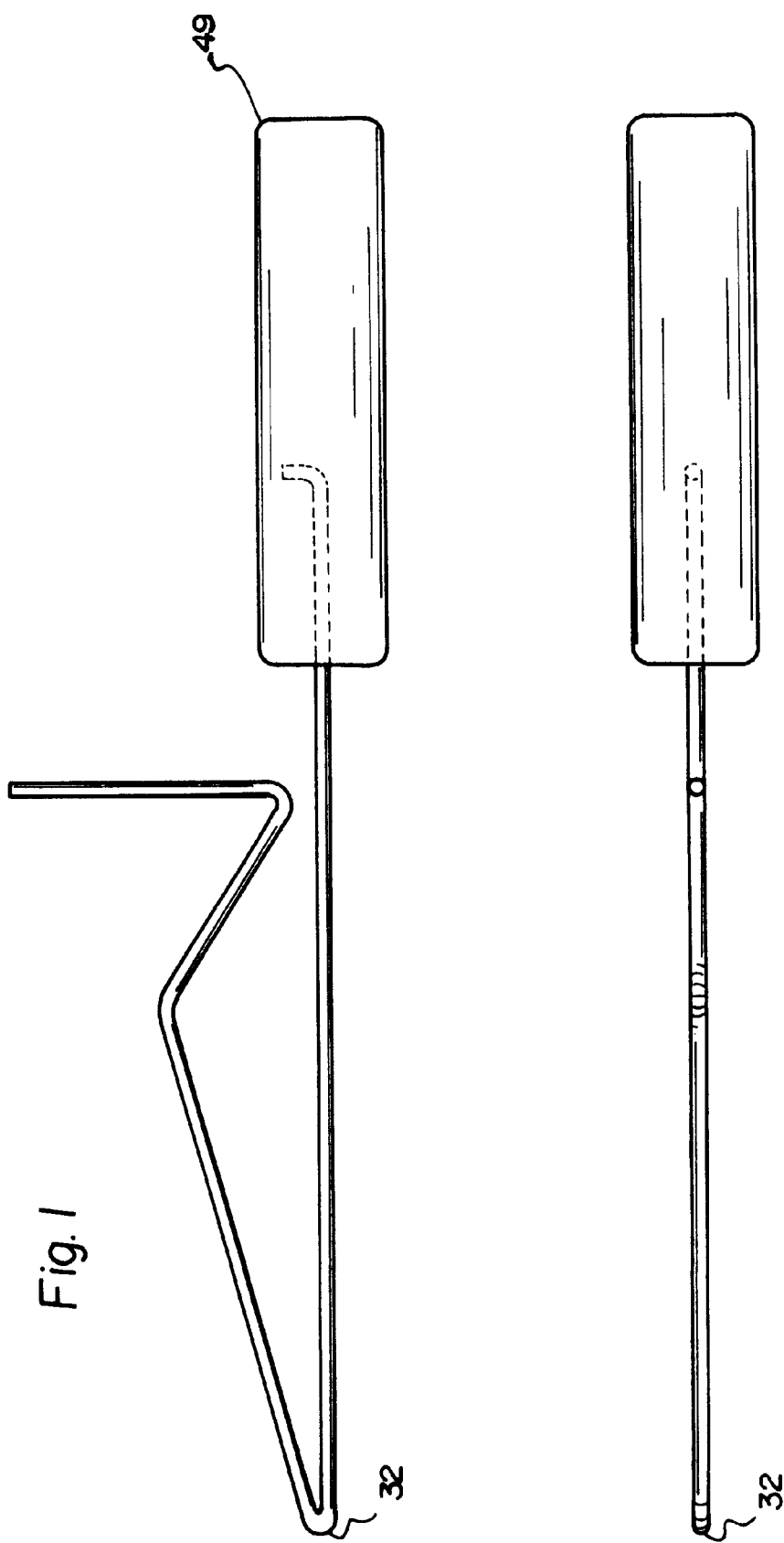

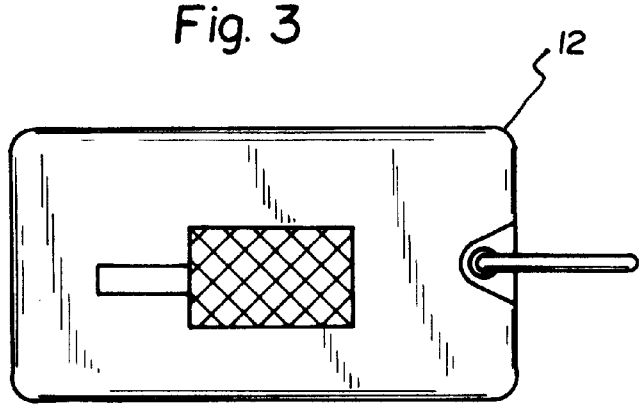
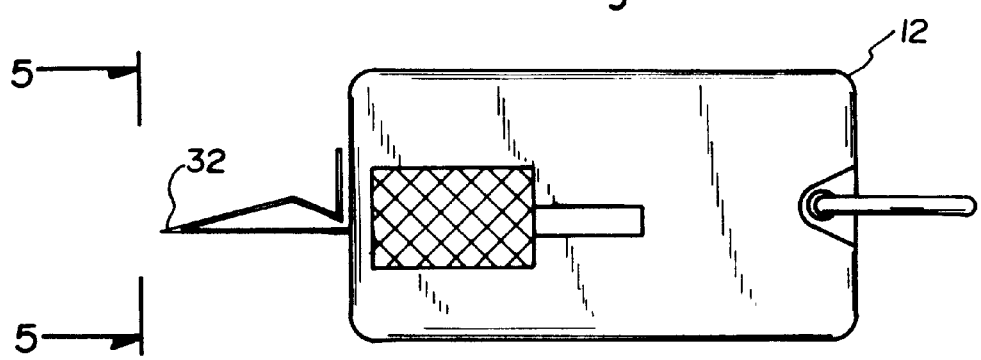
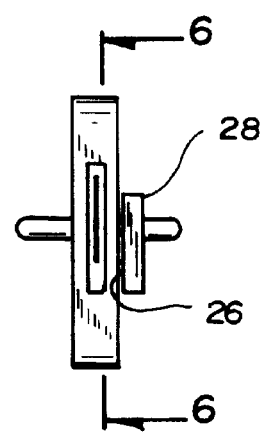

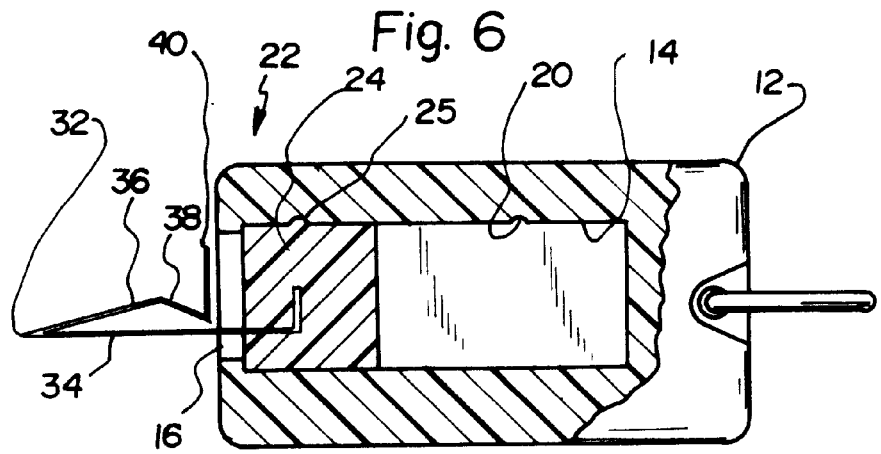
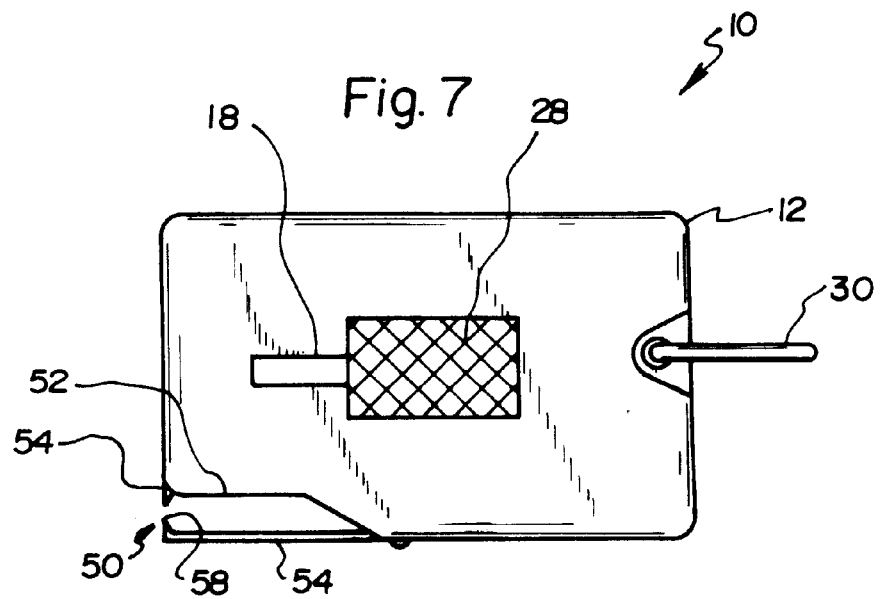
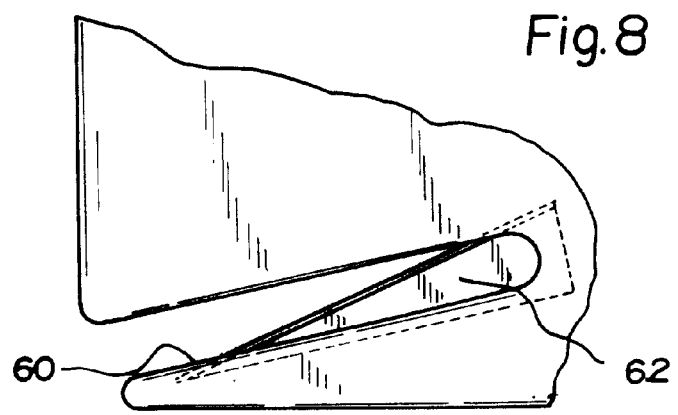

APPARATUS FOR THREADING A HOOK

BACKGROUND OF THE INVENTION

1. Field of the Invention

The present invention relates to needle threaders and more particularly pertains to a new apparatus for threading a hook for threading a loop of fishing line through an eyelet of a hook.

2. Description of the Prior Art

The use of needle threaders is known in the prior art. More specifically, needle threaders heretofore devised and utilized are known to consist basically of familiar, expected and obvious structural configurations, notwithstanding the myriad of designs encompassed by the crowded prior art which have been developed for the fulfillment of countless objectives and requirements.

Known prior art needle threaders include U. S. Pat. No. 5,251,797; U.S. Pat. No. 4,102,478; U.S. Pat. No. 4,679,370; U.S. Pat. No. 4,422,564; U.S. Pat. No. 3,894,602; and U.S. Pat. Des. 316,890.

In these respects, the apparatus for threading a hook according to the present invention substantially departs from the conventional concepts and designs of the prior art, and in so doing provides an apparatus primarily developed for the purpose of threading a loop of fishing line through an eyelet of a hook.

SUMMARY OF THE INVENTION

In view of the foregoing disadvantages inherent in the known types of needle threaders now present in the prior art, the present invention provides a new apparatus for threading a hook construction wherein the same can be utilized for threading a loop of fishing line through an eyelet of a hook.

The general purpose of the present invention, which will be described subsequently in greater detail, is to provide a new apparatus for threading a hook apparatus and method which has many of the advantages of the needle threaders mentioned heretofore and many novel features that result in a new apparatus for threading a hook which is not anticipated, rendered obvious, suggested, or even implied by any of the prior art needle threaders, either alone or in any combination thereof.

To attain this, the present invention generally comprises a compact housing having a rectangular front face, a rectangular rear face, and a periphery formed therebetween. The periphery is defined by a pair of long parallel edges and short parallel edges. As shown in FIG. 6, the housing has a first large primary slot formed between the front face and the rear face. The first large primary slot defines an opening along one of the short parallel edges of the housing. Associated therewith is a small secondary slot having a width and a length less than those of the large primary slot. The small secondary slot is formed in the front face in communication with the large primary slot and defines an elongated opening therein. For reasons that will become apparent hereinafter, an upper edge of the large primary slot has a pair of spaced indents formed therein. Next provided is a slider assembly including a primary block having a square configuration and a detent formed on a top edge thereof. The primary block is slidably situated within the first primary slot. Integrally coupled to a side face of the primary block is an interconnect which extends through the small secondary slot for sliding therein. A rectangular push tab has an outer knurled surface and an inner surface integrally coupled to the interconnect. In use, the push tab is adapted for allowing a user to slide the primary block within the large primary slot of the housing between a first orientation with the detent situated within a first indent located adjacent the opening of the large primary slot and a second orientation with the detent situated within a second indent located distant the opening of the large primary slot. As shown in the various Figures, an eyelet is formed in the housing adjacent one of the short parallel edges opposite the opening of the large primary slot. The eyelet serves for allowing the passage of a key ring therethrough. Also included is a hook threader wire having a long linear horizontal extent with a first end coupled to a leading edge of the primary block of the slider assembly. The hook threader wire further has a long angled extent having a first end integrally coupled to a second end of the long linear horizontal extent and forming a 16 degree angle therewith. A short angled extent of the wire is equipped with a first end integrally coupled to a second end of the long angled extent and defining a triangle with the long linear horizontal extent and the long angled extent. A short linear vertical extent is provided having a first end integrally coupled to a second end of the short angled extent and extending upwardly therefrom. During use, the hook threader wire resides entirely exterior of the housing when the primary block of the slider assembly is in the first orientation thereof. Further, the wire remains entirely within the primary slot of the housing when the primary block of the slider assembly is in the second orientation thereof. Finally, a line clipping assembly is provided including a generally rectangular cut out formed in one of the long parallel edges of the housing adjacent the opening of the primary slot. Such cut out defines a long edge and a short edge. A first rigid blade is mounted on an end of the long edge of the cut out with a cutting edge extending downwardly therefrom. A second flexible blade includes a long flexible extent with a first end connected to an end of the short edge of the cut out and extended in parallel with and spaced from the long edge of the cut out. A second end of the second flexible blade has a cutting edge extending upwardly therefrom for being releasably abutted with the cutting edge of the first rigid blade to clip a fishing line.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new apparatus for threading a hook apparatus and method which has many of the advantages of the needle threaders mentioned heretofore and many novel features that result in a new apparatus for threading a hook which is not anticipated, rendered obvious, suggested, or even implied by any of the prior art needle threaders, either alone or in any combination thereof.

It is another object of the present invention to provide a new apparatus for threading a hook which may be easily and efficiently manufactured and marketed.

It is a further object of the present invention to provide a new apparatus for threading a hook which is of a durable and reliable construction.

An even further object of the present invention is to provide a new apparatus for threading a hook which is susceptible of a low cost of manufacture with regard to both materials and labor, and which accordingly is then susceptible of low prices of sale to the consuming public, thereby making such apparatus for threading a hook economically available to the buying public.

Still yet another object of the present invention is to provide a new apparatus for threading a hook which provides in the apparatuses and methods of the prior art some of the advantages thereof, while simultaneously overcoming some of the disadvantages normally associated therewith.

Still another object of the present invention is to provide a new apparatus for threading a hook for threading a loop of fishing line through an eyelet of a hook.

Even still another object of the present invention is to provide a new apparatus for threading a hook that includes a housing and a hook threader wire coupled to the housing for threading a fishing line through an eyelet of a hook such that a pair of free ends of the fishing line reside on a first side of the eyelet and the fishing line forms a closed loop on a second side of the eyelet.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side view of one of the embodiments of the new apparatus for threading a hook according to the present invention.

FIG. 2 is a top view of the embodiment of the present invention shown in FIG. 1.

FIG. 3 is a side view of another embodiment of the present invention in a first orientation.

FIG. 4 is a side view of the embodiment of the present invention shown in FIG. 3 but in a second orientation.

FIG. 5 is an end view of the embodiment of the FIG. 3.

FIG. 6 is a cross-sectional view of the present invention taken along line 6—6 shown in FIG. 5.

FIG. 7 is a side view of another embodiment of the present invention.

FIG. 8 is a side view of yet another embodiment of the present invention.

DESCRIPTION OF THE PREFERRED EMBODIMENT

With reference now to the drawings, and in particular to FIGS. 1 through 8 thereof, a new apparatus for threading a hook embodying the principles and concepts of the present invention and generally designated by the reference numeral 10 will be described.

The present invention, as designated as numeral 10, includes a compact housing 12 having a rectangular front face, a rectangular rear face, and a periphery formed therebetween. The periphery is defined by a pair of long parallel edges and short parallel edges. As shown in FIG. 6, the housing has a first large primary slot 14 formed between the front face and the rear face. The first large primary slot defines an opening 16 along one of the short parallel edges of the housing.

Associated therewith is a small secondary slot 18 having a width and a length less than those of the large primary slot. The small secondary slot is formed in the front face in communication with the large primary slot and defines an elongated opening in the front face. For reasons that will become apparent hereinafter, an upper edge of the large primary slot has a pair of spaced indents 20 formed therein.

Next provided is a slider assembly 22 including a primary block 24 having a square configuration and a detent 25 formed on a top edge thereof. The primary block is slidably situated within the first primary slot. Integrally coupled to a side face of the primary block is an interconnect 26 which extends through the small secondary slot for sliding therein. A rectangular push tab 28 has an outer knurled surface and an inner surface integrally coupled to the interconnect.

In use, the push tab is adapted for allowing a user to slide the primary block within the large primary slot of the housing between a first orientation with the detent situated within a first indent located adjacent the opening of the large primary slot and a second orientation with the detent situated within a second indent located distant the opening of the large primary slot.

As shown in the various Figures, an eyelet 30 is formed in the housing adjacent one of the short parallel edges opposite the opening of the large primary slot. The eyelet serves for allowing the passage of a key ring therethrough.

Also included is a hook threader wire 32 comprising a long linear horizontal extent 34 and an intermediate extent 35. The long linear horizontal extent has a first end 37 coupled to a leading edge of the primary block of the slider assembly. The intermediate extent further comprises a long angled extent 36, a short angled extent 38, and a short linear vertical extent 40. The long angled extent having a first end 39 integrally coupled to a second end of the long linear horizontal extent and forming a 16 degree angle therewith. The short angled extent of the wire is equipped with a first end integrally coupled to a second end of the long angled extent and defining a triangle with the long linear horizontal extent and the long angled extent. The short linear vertical extent is provided having a first end integrally coupled to a second end of the short angled extent and extending upwardly therefrom. The short linear vertical extent ideally has a length of about 1/3 that of the long linear horizontal extent.

During use, the hook threader wire resides entirely exterior of the housing when the primary block of the slider assembly is in the first orientation thereof. Further, the wire remains entirely within the primary slot of the housing when the primary block of the slider assembly is in the second orientation thereof. In the alternative, the hook threader wire may have the first end of the long linear horizontal extent thereof coupled directly to a simple handle 49 in lieu of the housing, as shown in FIGS. 1 & 2.

Finally, a line clipping assembly 50 is provided including a generally rectangular cut out 52 formed in one of the long parallel edges of the housing adjacent the opening of the primary slot. Such cut out defines a long edge and a short edge. A first rigid blade 54 is mounted on an end of the long edge of the cut out with a cutting edge extending downwardly therefrom. A second flexible blade 56 includes a long flexible extent with a first end connected to an end of the short edge of the cut out and extended in parallel with and spaced from the long edge of the cut out. A second end of the second flexible blade has a cutting edge 58 extending upwardly therefrom for being releasably abutted with the cutting edge of the first rigid blade to clip a fishing line.

In the alternative, the clipping assembly may be excluded in favor of a slot 60 with a beveled blade 62 formed therein, as shown in FIG. 8. Further, it should be noted that the clipping assembly may be excluded all together. Note FIGS. 3 & 4.

To use the present invention, the horizontal and angled extents of the threader wire are slid though an eyelet of a hook until the eyelet abuts the vertical extent of the wire. It should be noted that the angled extents are adapted to be biased against the long linear horizontal extent while within the eyelet. Once the eyelet of the hook abuts the vertical extent, the angled extents take their original shape for allowing a fishing line to be insert therethrough. Thereafter, the threaded wire and line are pulled through the eyelet and the threaded wire is removed from the line. As such, the present invention threads a fishing line through an eyelet of the hook such that a pair of ends of the fishing line reside on a first side of the eyelet and the fishing line forms a closed loop on a second side of the eyelet for facilitating the securement of the line to the hook.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An apparatus for threading a hook comprising, in combination:

a compact housing having a rectangular front face, a rectangular rear face, and a periphery formed therebetween defined by a pair of long parallel edges and short parallel edges, the housing having a first large primary slot formed between the front face and the rear face and defining an opening along one of the short parallel edges of the housing and a small secondary slot having a width and a length less than those of the large primary slot with the small secondary slot being formed in the front face in communication with the large primary slot and defining an elongated opening therein, an upper edge of the large primary slot having a pair of spaced indents formed therein;

a slider assembly including a primary block having a square configuration with a detent formed on a top edge thereof with the primary block being slidably situated within the first primary slot, an interconnect integrally coupled to a side face of the primary block and extending through the small secondary slot for sliding therein, and a rectangular push tab having an outer knurled surface and an inner surface integrally coupled to the interconnect for allowing a user to slide the primary block within the large primary slot of the housing between a first orientation with the detent situated within a first indent located adjacent the opening of the large primary slot and a second orientation with the detent situated within a second indent located distant the opening of the large primary slot;

an eyelet formed in the housing adjacent one of the short parallel edges opposite the opening of the large primary slot for allowing the passage of a key ring therethrough;

a hook threader wire having a long linear horizontal extent with a first end coupled to a leading edge of the primary block of the slider assembly, a long angled extent having a first end integrally coupled to a second end of the long linear horizontal extent and forming a 16 degree angle therewith, a short angled extent having a first end integrally coupled to a second end of the long angled extent and defining a triangle with the long linear horizontal extent and the long angled extent, and a short linear vertical extent having a first end integrally coupled to a second end of the short angled extent and extending upwardly therefrom, whereby the hook threader wire resides entirely exterior of the housing when the primary block of the slider assembly is in the first orientation thereof and further remains entirely within the primary slot of the housing when the primary block of the slider assembly is in the second orientation thereof; and a line clipping assembly including a generally rectangular cut out formed in one of the long parallel edges of the housing adjacent the opening of the primary slot wherein the cut out defines a long edge and a short edge, a first rigid blade mounted on an end of the long edge of the cut out with a cutting edge extending downwardly therefrom, and a second flexible blade having a long flexible extent with a first end connected to an end of the short edge of the cut out and extending in parallel with and spaced from the long edge of the cut out with a second end having a cutting edge extending upwardly therefrom for being releasably abutted with the cutting edge of the first rigid blade to clip a fishing line.

2. An apparatus for threading a hook having an eye, the apparatus comprising:

a housing; and a hook threader wire having a long linear horizontal extent and an intermediate extent, the long linear horizontal extent having a first end coupled to the housing, the intermediate extent including a long angled extent, a short angled extent and short linear vertical extent, the long angled extent having a first end integrally coupled to a second end of the long linear horizontal extent for facilitating the passage of the hook threader wire through the eye of the hook, the short angled extent having a first end integrally coupled to a second end of the long angled extent and defining a triangular configuration with the long linear horizontal extent and the long angled extent, the short linear vertical extent having a first end integrally coupled to a second end of the short angled extent and extending upwardly therefrom, wherein the hook threader wire resides in a single plane.

3. An apparatus as set forth in claim 2 wherein the hook threader is coupled to a block which is slidably situated within a slot formed in the housing.

4. An apparatus as set forth in claim 3 wherein the block has a detent which engages one of two indents formed in the slot.

5. An apparatus as set forth in claim 3 wherein a push tab is coupled with the block for allowing the manual sliding of the block within the housing.

6. An apparatus as set forth in claim 2 and further including a line clipping assembly formed on the housing.

7. An apparatus as set forth in claim 6 wherein the line clipping assembly includes a pair of clippers.

8. An apparatus as set forth in claim 6 wherein the line clipping assembly includes a slot with a beveled blade formed therein.

9. An apparatus as set forth in claim 2 wherein an eyelet is formed in the housing for allowing the passage of a key ring therethrough.

10. An apparatus for threading a hook comprising:

a housing; and a hook threader wire including a long linear horizontal extent, a long angled extent, a short angled extent and a short linear vertical extent, the long linear horizontal extent having a first end coupled to the housing, the long angled extent having a first end integrally coupled to a second end of the long linear horizontal extent and forming an angle substantially 16 degrees, the short angled extent having a first end integrally coupled to a second end of the long angled extent and defining a triangular configuration with the long linear horizontal extent and the long angled extent, the short linear vertical extent having a first end integrally coupled to a second end of the short angled extent and extending upwardly therefrom, the long linear horizontal extent, the long angled extent and the short angled extent being passed through an eyelet of a hook such that the eyelet abuts the short linear vertical extent, a free end of a fishing line on a first side of the eyelet being passed between the long linear horizontal extent and the long angled portion, the hook threading wire and the fishing line being drawn back through the eyelet and the hook threading wire removed from the fishing line, the fishing line forms a closed loop on a second side of the eyelet for facilitating the securement of the fishing line to the hook.

* * * * *